(12) United States Patent
Demchenko et al.

(10) Patent No.: US 11,280,661 B2
(45) Date of Patent: Mar. 22, 2022

(54) ULTRASONIC FLUID LEVEL SENSOR

(71) Applicants: Aleksandr P. Demchenko, St. Petersburg (RU); Nikolai I. Balin, St. Petersburg (RU)

(72) Inventors: Aleksandr P. Demchenko, St. Petersburg (RU); Nikolai I. Balin, St. Petersburg (RU)

( * ) Notice: Subject to any disclaimer, the term of this patent is extended or adjusted under 35 U.S.C. 154(b) by 0 days.

(21) Appl. No.: 16/993,887

(22) Filed: Aug. 14, 2020

(65) Prior Publication Data
US 2020/0370943 A1  Nov. 26, 2020

Related U.S. Application Data

(63) Continuation of application No. PCT/RU2019/000060, filed on Jan. 31, 2019.

(30) Foreign Application Priority Data

Feb. 14, 2018 (RU) ................................ 2018105640

(51) Int. Cl.
*G01F 23/296* (2006.01)
(52) U.S. Cl.
CPC ................ *G01F 23/2966* (2013.01)
(58) Field of Classification Search
CPC .................................................. G01F 23/2966
See application file for complete search history.

(56) References Cited

U.S. PATENT DOCUMENTS

| 2,503,831 | A | | 4/1950 | Mason |
| 3,229,523 | A | | 1/1966 | Boyd |
| 3,396,285 | A | * | 8/1968 | Minchenko ............ G10K 11/08 |
| | | | | 310/325 |

(Continued)

FOREIGN PATENT DOCUMENTS

| RU | 2126957 C1 | 2/1999 |
| RU | 2127873 C1 | 3/1999 |

(Continued)

OTHER PUBLICATIONS

International Search Report from PCT/RU2019/000060, filed Jan. 31, 2019, dated May 30, 2019.

*Primary Examiner* — John Fitzgerald
(74) *Attorney, Agent, or Firm* — Patentbar International PC

(57) ABSTRACT

The fluid-level sensor has an acoustic waveguide comprising a flexible metal rod, an electroacoustic transducer coupled to one end of the acoustic waveguide and an acoustic resonator coupled to the other end of the acoustic waveguide. The flexible metal rod has two ends, one cylindrical waveguide coupled via a conical acoustic concentrator to one end of the flexible metal rod, the other cylindrical waveguide coupled via a conical concentrator to the other end of the flexible metal rod. One cylindrical waveguide is coupled to the electroacoustic transducer and the other cylindrical waveguide is coupled to the acoustic resonator. The structure provides for the enhanced functional capabilities of the sensor by using it under the conditions of high temperature, radiation, strong electromagnetic interference, intense vibrations, impacts, and other negative factors. The sensor can be installed, maintained, and repaired without hazard to servicing personnel.

10 Claims, 4 Drawing Sheets

(56) References Cited

U.S. PATENT DOCUMENTS

| | | | |
|---|---|---|---|
| 3,546,498 A | | 12/1970 | McMaster et al. |
| 3,590,288 A | * | 6/1971 | Minchenko ............ H04R 17/10 |
| | | | 310/325 |
| 3,708,745 A | | 1/1973 | McMaster et al. |
| 4,523,465 A | | 6/1985 | Fasching et al. |
| 4,564,881 A | * | 1/1986 | Kant .................... G01F 23/263 |
| | | | 361/284 |
| 5,103,672 A | * | 4/1992 | Terry, Jr. ............... G01F 23/268 |
| | | | 361/284 |
| 5,651,285 A | * | 7/1997 | Legras ................ G01F 23/0023 |
| | | | 73/290 V |
| 5,994,818 A | * | 11/1999 | Abramov ................. B06B 3/00 |
| | | | 310/323.01 |
| 6,272,921 B1 | * | 8/2001 | Ivanovich ........... G01F 23/2966 |
| | | | 73/290 V |
| 6,988,404 B2 | * | 1/2006 | Motzer ................... B08B 1/008 |
| | | | 73/290 R |
| 7,827,862 B2 | * | 11/2010 | Fauveau ................. G01F 23/26 |
| | | | 73/304 C |
| 7,869,307 B2 | | 1/2011 | Yamada et al. |
| 8,248,888 B1 | | 8/2012 | Enzler et al. |
| 9,550,260 B2 | | 1/2017 | Birtcher et al. |
| 10,551,238 B2 | * | 2/2020 | Knowles ............... G01F 23/296 |
| 2002/0023489 A1 | * | 2/2002 | Reimelt ................ G01F 23/284 |
| | | | 73/290 V |
| 2020/0371067 A1 | * | 11/2020 | Demchenko ........... G10K 11/22 |

FOREIGN PATENT DOCUMENTS

| | | |
|---|---|---|
| RU | 15132 U1 | 9/2000 |
| RU | 2201169 C2 | 3/2003 |
| RU | 2580907 C1 | 4/2016 |
| WO | 1998/028598 A1 | 7/1998 |

\* cited by examiner

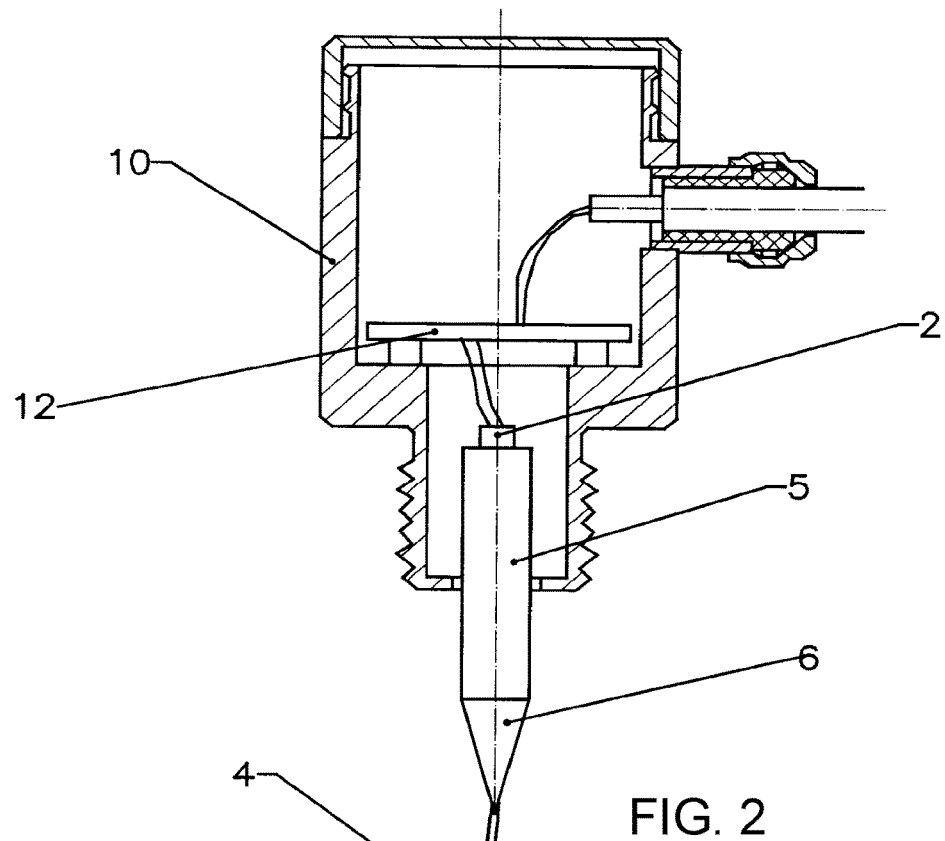
FIG. 2
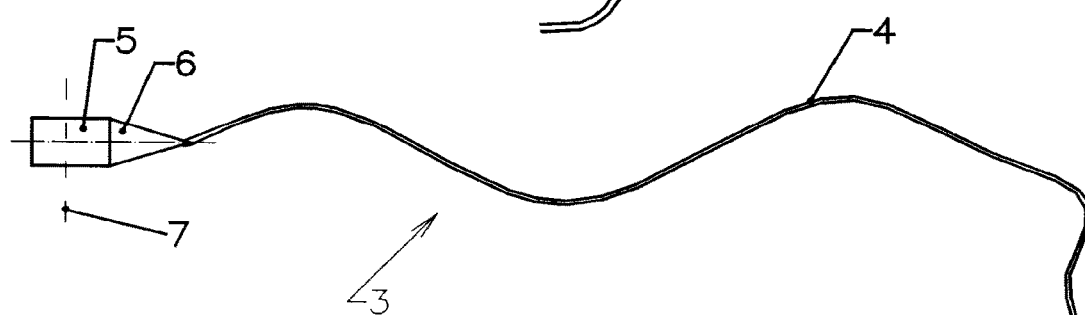
FIG. 3
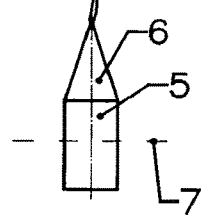

ULTRASONIC FLUID LEVEL SENSOR

RELATED APPLICATIONS

This Application is a Continuation Application of International Application PCT/RU2019/000060, filed on Jan. 31, 2019, which in turn claims priority to Russian Patent Application RU 2018105640, filed Feb. 14, 2018, both of which are incorporated herein by reference in their entirety.

FIELD OF THE INVENTION

The invention relates to the devices for indicating levels of fluid by measuring parameters of sound waves.

BACKGROUND OF THE INVENTION

Indicators of the level of fluid often call for spacing apart of the major units of the device, the electroacoustic transducer and sensing element—resonator, at a needed distance. It is particularly important in those cases when the sensor is used in extreme conditions caused by high temperatures, high-activity penetrating radiation, strong electromagnetic interference, intense vibration, aggressive substances hazardous to sensor components and maintenance personnel, and other similar factors in the working area where the sensing element of the device is disposed.

An extended metal waveguide can be used to space apart the electroacoustic transducer and resonator. However, simply extending the length of the waveguide is only possible at a short distance (up to one meter) and only in the case of a straight-line waveguide.

Known are sensor structures where the electroacoustic transducer and resonator are spaced apart at a specific distance.

U.S. Pat. No. 9,550,260, publication dated Jan. 24, 2017, MPK G01F023/296, discloses the structure of an ultrasonic sensor containing an electroacoustic transducer and multiple acoustic resonators connected with narrow tubes—waveguides with electroacoustic transducers. Special fittings are used for passage of waveguides.

U.S. Pat. No. 8,248,888, publication dated Aug. 21, 2012, MPK G01S015/00 discloses the structure of an ultrasonic level gage with a tubular waveguide connecting the electroacoustic transducer with the resonator.

Using tubular waveguides requires employing special transition devices in case the waveguide should pass through a partition or a screen.

Known is the structure of the sensor under patent RU2127873, publication Mar. 20, 1999, which is the closest analogue and contains an electroacoustic transducer and an acoustic resonator.

SUMMARY OF THE INVENTION

The technical result achieved by the present invention is the enhanced functional capabilities of the sensor when used under the conditions of high temperature, radiation, strong electromagnetic interference, intense vibrations, impacts and other negative factors. In addition, installation, maintenance, repair of the device without hazard of the adverse factors for the maintenance personnel is provided.

The ultrasonic fluid-level sensor comprises an acoustic waveguide, an electroacoustic transducer disposed on one end of the waveguide and an acoustic resonator disposed on the other end of the guide. Further, the acoustic waveguide comprises a flexible metal rod with a cylindrical waveguide attached to each end of the metal rod through a conical acoustic concentrator; further, one cylindrical waveguide is attached to an electroacoustic transducer and the other cylindrical waveguide is attached to an acoustic resonator—a sensing element of the sensor.

Using a flexible metal rod for connecting an acoustic resonator and electroacoustic transducer expands the possible applications for the sensor. The acoustic resonator, sensing element of the sensor, and electroacoustic transducer can be spaced apart, thus, simplifying the installation of separate components of the device. Moreover, the sensing component of the sensor—the resonator—can be disposed in the area essential for monitoring the level of a fluid, while the electroacoustic transducer may be disposed in place convenient and safe for the personnel and characterized by a normal temperature, absence of radiation, interferences, vibrations.

Communication between the electroacoustic transducer and the resonator is provided by transmitting ultrasonic pulses along a flexible metal rod resistant to temperature, radiation, vibrations, and other aggressive effects adversely affect the transducer and maintenance personnel.

For passage through metal, partitions, walls, and shells, the acoustic waveguide has waveguide sections—cylindrical waveguides, whose external surfaces may be used for its hermetic attachment (e.g. by welding) to intersected walls, shells, and partitions.

Furthermore, the flexible metal rod is can be shaped to fit in an allocated space. Moreover, the flexible metal rod can be made in the form of a wire. Specifically, a flexible metal rod in the form of a wire can have a diameter of 3-6 mm.

A conical acoustic concentrator is rigidly attached with its top to the flexible metal rod—wire and is rigidly attached with its wide part to a corresponding cylindrical waveguide. In addition, a top of the mentioned conical acoustic concentrator has a diameter equal to a diameter of the flexible metal rod, and a wide part of the mentioned conical acoustic concentrator has a diameter equal to a diameter of the cylindrical waveguide.

In particular, one of the cylindrical waveguides can be rigidly attached to the acoustic resonator.

Specifically, the external surface of at least one cylindrical waveguide is configured to be rigidly and hermetically coupled to the partition intersected by the waveguide.

Specifically, an acoustic waveguide section comprising a flexible metal rod and conical acoustic concentrators, can be disposed in a protective flexible tube. The tube can be fit with internal adapters for attaching the flexible waveguide inside the protective tube and can be attached to the external surfaces of the flexible metal rod.

BRIEF DESCRIPTION OF THE DRAWINGS

FIG. 2 shows a structure of an electroacoustic transducer in a body with a connected acoustic waveguide;

FIG. 3 shows a structure for a sensor acoustic waveguide;

DETAILED DESCRIPTION OF THE PREFERRED EMBODIMENTS

Figure 1:
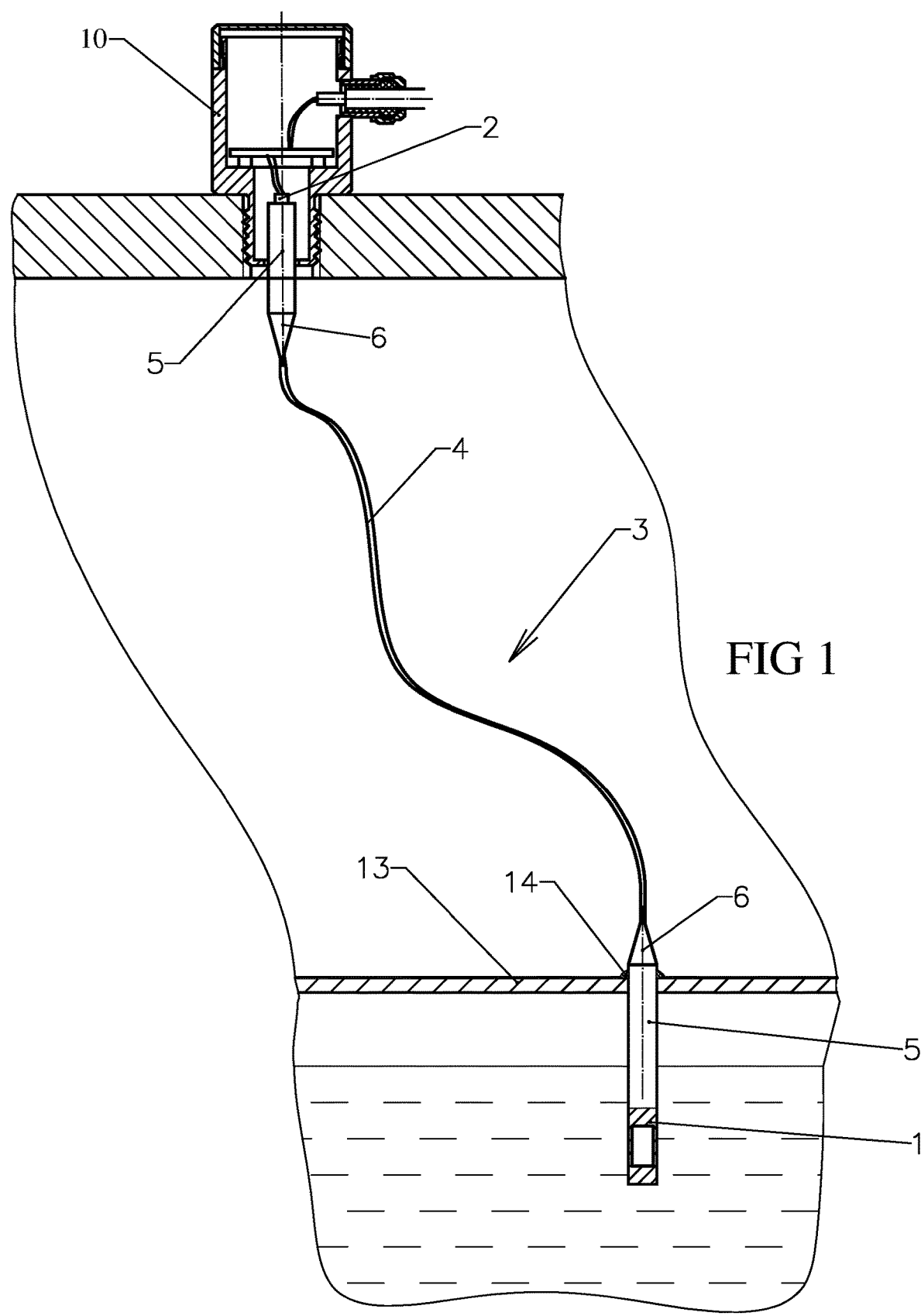
FIG. 1 shows a structure of a sensor set in the operating position.
Figure 6:
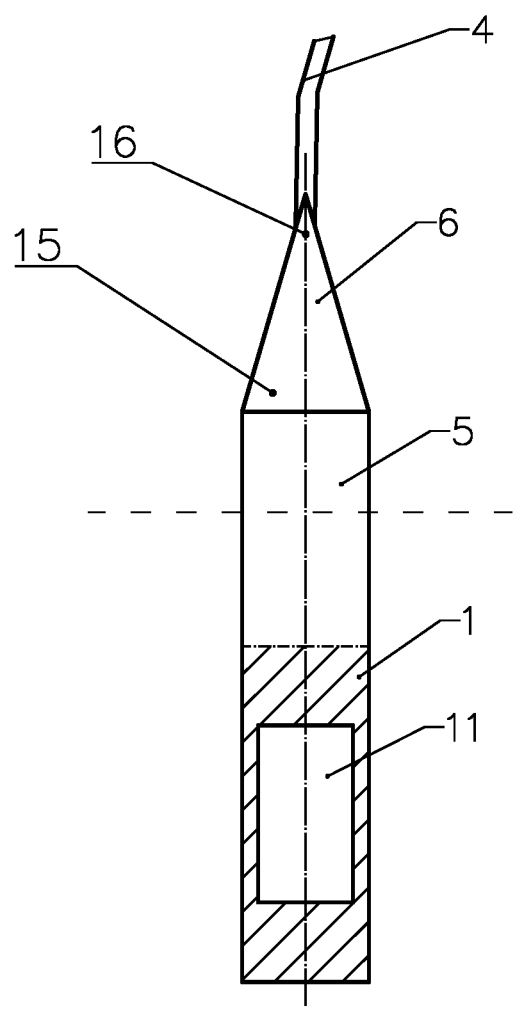
FIG. 6 shows an embodiment of a sensor acoustic resonator with an enclosed cavity.

The ultrasonic liquid-level sensor comprises an acoustic resonator 1 connected through acoustic a waveguide 3 with an electroacoustic transducer 2 (FIG. 1). Acoustic waveguide 3 comprises a flexible metal rod 4, with a cylindrical waveguide 5 rigidly attached to each end of flexible metal rod 4 through corresponding conical acoustic concentrator 6. One cylindrical waveguide 5 is connected to acoustic resonator 1 while the other is connected to electroacoustic transducer 2. Flexible metal rod 4 may be made as a flexible rod or wire with a diameter of 3-6 mm Flexible metal rod 4 is rigidly attached at each end to a top 16 of a corresponding conical acoustic concentrator 6, which, in turn, is attached by a wide part 15 to a corresponding cylindrical waveguides 5 (FIG. 3; FIG. 6). As is shown in the figure, top 16 of conical acoustic concentrator 6 has a diameter close to a diameter of flexible metal rod 4, and wide part 15 of conical acoustic concentrator 6 has a diameter close to a diameter of cylindrical waveguide 5. Electroacoustic transducer 2 may be placed in body 10 (FIG. 2) allowing it to be installed on any base. Electronic unit 12 may be placed in body 10.

If necessary, acoustic waveguide 3 may be rigidly and hermetically installed in a partition or base by attaching an external surface of any cylindrical waveguide 5, approximately in attachment area 7 of cylindrical waveguide 5 (FIG. 3). FIG. 1 shows an attachment of cylindrical waveguide 5 to partition 13 using weld joint 14. In this case, flexible metal rod 4 (wire) may take a form suitable for arranging rod 4 in a space allocated to it.

Acoustic resonator 1 of various types can be used with the present sensor. For example, as it is shown on FIG. 6, with enclosed cavity 11.

Figure 4:
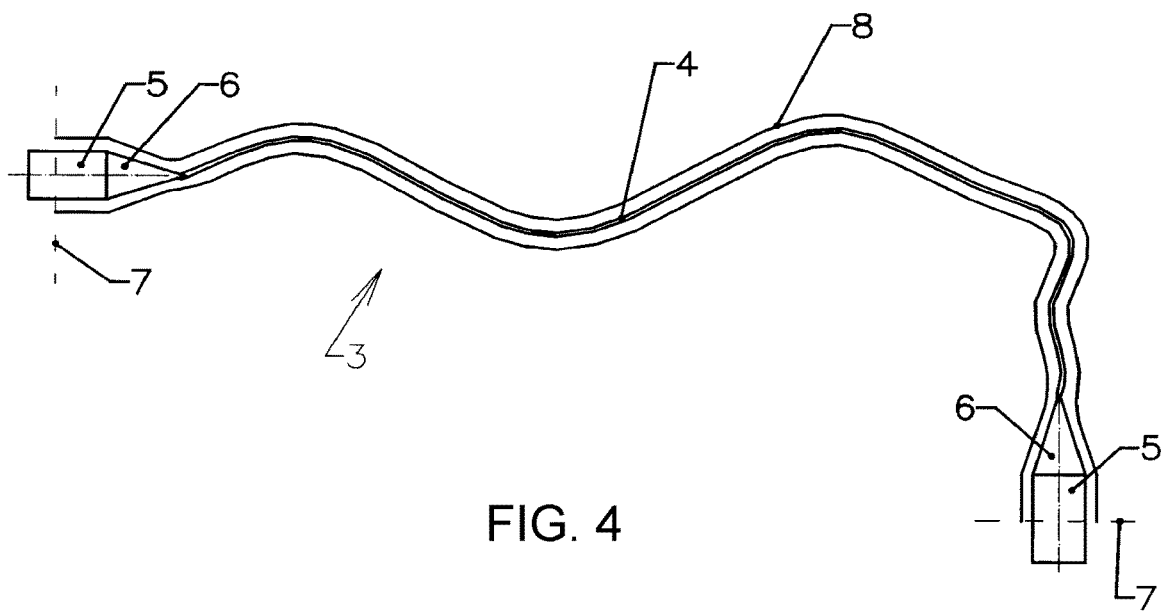
FIG. 4 shows a structure for an acoustic waveguide in a cladding.

A section of acoustic waveguide 3 comprising flexible metal rod 4 and conical acoustic concentrators 6 may be placed in a protective flexible tube 8, e.g. a corrugated metal tube, to protect them from contamination, liquids, and damage (FIG. 4).

Figure 5:
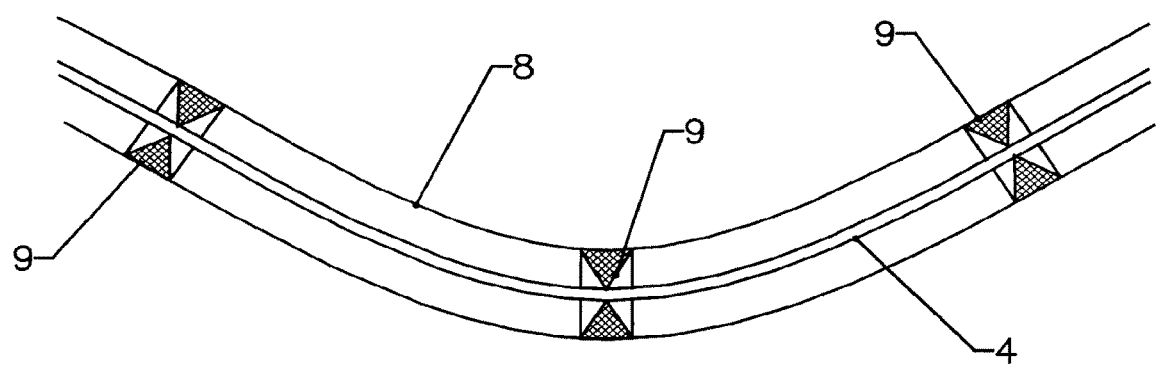
FIG. 5 shows a part of a cladding of an acoustic waveguide with adaptors.

Protective flexible tube 8 can be provided with adapters 9 (FIG. 5) for coupling the flexible waveguide inside the protective tube and can be coupled to the external surfaces of flexible metal rod 4. Adapters 9 can be conical sleeves with an internal aperture for a wire with a diameter slightly larger than the diameter of flexible rod (wire) 4.

Using a pulse generator (not shown in the figures) of electronic unit 12, electroacoustic transducer 2, cylindrical waveguide 5, and conical acoustic concentrator 6, which is also an acoustic adapter, pulse acoustic oscillations are transferred to flexible metal rod 4 (wire). From the opposite side of the thin flexible metal rod 4, using acoustic concentrator 6, the oscillations are transferred to cylindrical waveguide 5, acoustic resonator 1 being attached to the opposite end of cylindrical waveguide 5. Having reached the resonator 1, the acoustic pulse causes natural oscillation of resonator 1, whose duration depends on the medium (liquid or gaseous) in which it is placed.

Natural oscillations of resonator 1, while propagating in the direction reverse to the direction of a driving pulse, successively pass through cylindrical waveguide 5, conical acoustic concentrator 6, thin metal rod 4, conical acoustic concentrator 6, and cylindrical waveguide 5, and reach electroacoustic transducer 2. An electrical pulse signal is formed on the terminals of transducer 2, the shape, properties, and type of the pulse signal are determined by the type (shape, properties) of the natural oscillations of acoustic resonator 1. Electrical circuit 12 processes the received oscillations, estimates the damping factor of natural oscillations of resonator 1 and determines in which medium, fluid or not fluid, resonator 1 is disposed.

Attenuation of the signal as it propagates along the flexible rod limits the usable length of the rod. It has been practically confirmed that a rod up to 12 m long can be used as a fluid-level indicator.

INDUSTRIAL APPLICABILITY

The sensor allows utilizing a flexible metal rod, a wire within the acoustic waveguide in making a waveguide of the needed length and configuration. Using a flexible long metal wire for connecting the main elements of the sensor simplifies the assembly of its individual components. It becomes possible to spacing apart the sensing element of the sensor (acoustic resonator) and electroacoustic transducer from each other. In this case, the sensing elements of the sensor—the acoustic resonator—can be disposed in the needed place and position for monitoring the level of the fluid, and the electroacoustic transducer can be disposed in a location which is safe and convenient for maintenance personnel.

In this case the communication between the electroacoustic transducer and the sensing element of the device—the resonator—is accomplished through the transmission of ultrasonic pulses along the flexible thin metal wire, which is resistant to temperature, radiation, vibration, and other aggressive effects that would adversely affect the transducer and maintenance personnel.

The sensor of the present configuration can be used at a high temperature, under conditions of different types of radiation, strong electromagnetic interference, intense vibrations, impacts. The sensor can be easily maintained and repaired without hazard from adverse factors to servicing personnel.

What is claimed is:

1. An ultrasonic liquid-level sensor comprising:
   an acoustic waveguide having an electroacoustic transducer on one end and an acoustic resonator on the other end;
   wherein the acoustic waveguide comprises:
      a flexible metal rod, wherein each end of the flexible metal rod is attached to an end of a corresponding cylindrical waveguide through a corresponding conical acoustic concentrator;
      wherein the other end of one cylindrical waveguide is attached to the electroacoustic transducer; and
      wherein the other end of the other cylindrical waveguide is attached to the acoustic resonator;
   wherein an external surface of at least one cylindrical waveguide is rigidly attached to a partition intersected by the at least one cylindrical waveguide.

2. The ultrasonic sensor according to claim 1, wherein the acoustic resonator has a cavity isolated from the external medium.

3. The ultrasonic sensor according to claim 1, wherein a top of each conical acoustic concentrator is rigidly attached to the flexible metal rod and a wide part of each conical acoustic concentrator is rigidly attached to the corresponding cylindrical waveguide.

4. The ultrasonic sensor according to claim 1, wherein the top of each conical acoustic concentrator has a diameter equal to a diameter of the flexible metal rod and the wide part of each conical acoustic concentrator has a diameter equal to a diameter of the corresponding cylindrical waveguide.

5. The ultrasonic sensor according to claim 1, wherein one of the cylindrical waveguides is rigidly attached to the acoustic resonator.

6. The ultrasonic sensor according to claim 1, wherein a section of the acoustic waveguide comprising the flexible metal rod and the conical acoustic concentrators is placed in a protective flexible tube.

7. The ultrasonic sensor according to claim 6, wherein the protective tube is attached to an external surface of the flexible metal rod and comprises adapters for attaching the flexible metal rod inside the protective tube.

8. The ultrasonic sensor according to claim 1, wherein the flexible metal rod takes a shape necessary to arrange the flexible metal rod in an allocated space.

9. The ultrasonic sensor according to claim 8, wherein the flexible metal rod is made in the form of a wire.

10. The ultrasonic sensor according to claim 9 wherein the mentioned wire has a maximum diameter of 3-6 mm.

* * * * *